C. W. SKINNER.
IRRIGATION APPARATUS.
APPLICATION FILED SEPT. 11, 1909.
1,197,772.
Patented Sept. 12, 1916.
3 SHEETS—SHEET 1.
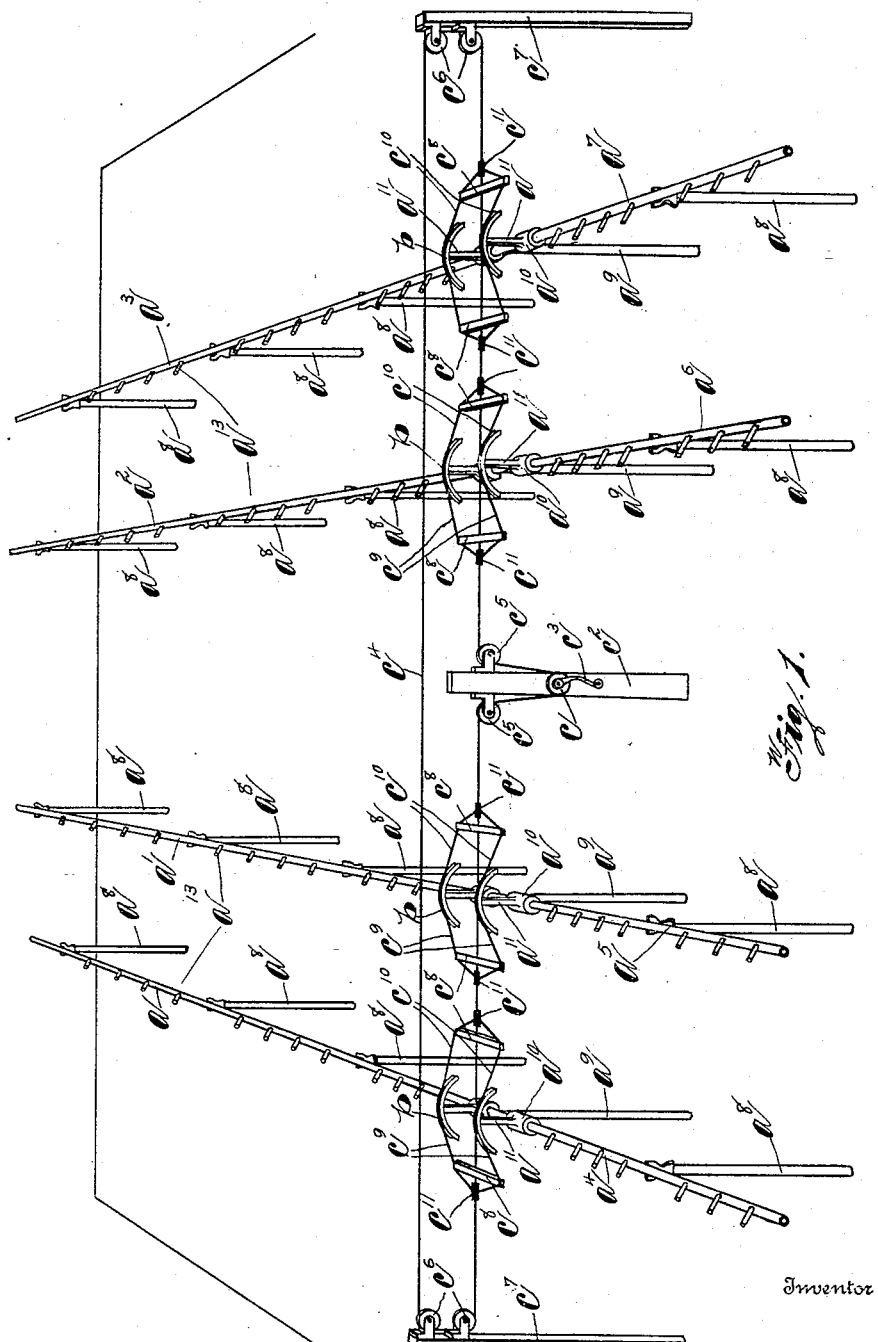

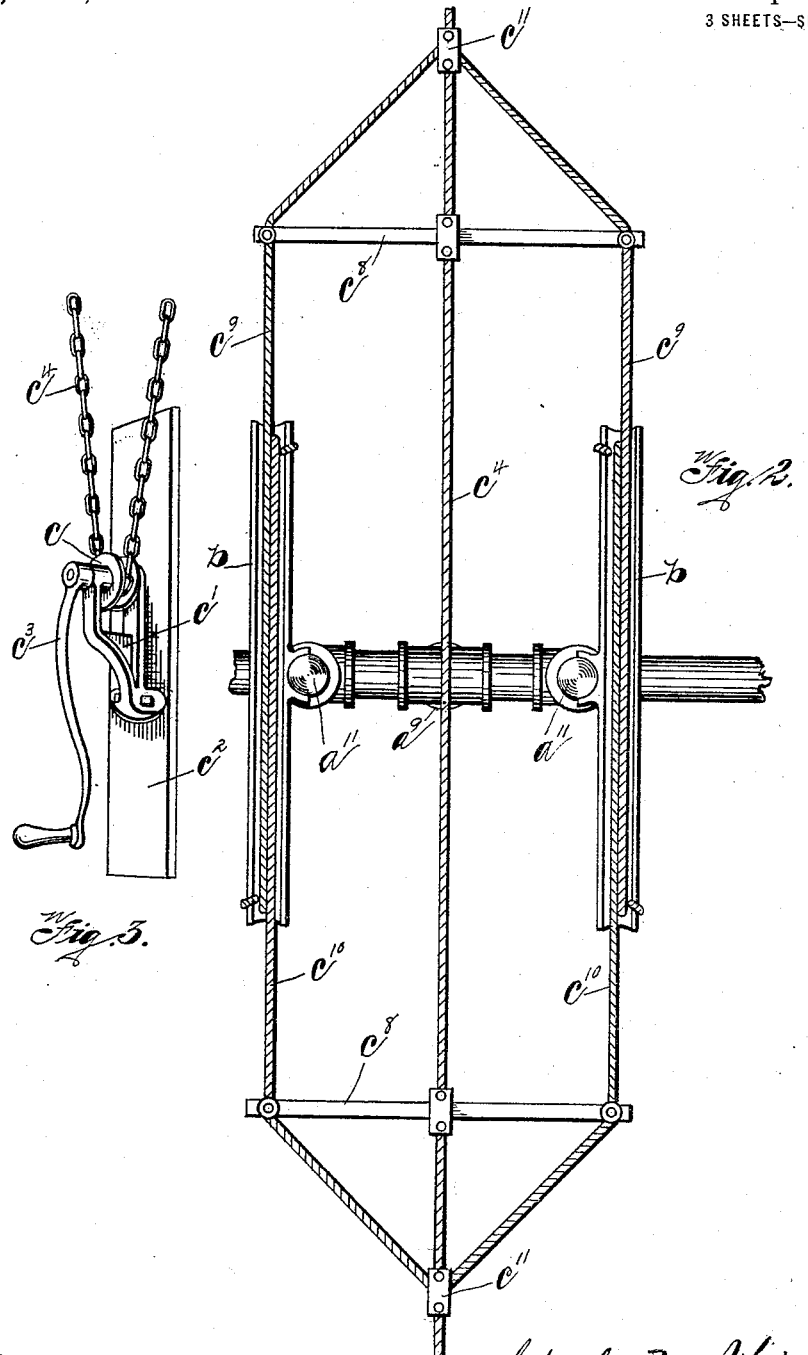

C. W. SKINNER.
IRRIGATION APPARATUS.
APPLICATION FILED SEPT. 11, 1909.
1,197,772.
Patented Sept. 12, 1916
3 SHEETS—SHEET 3.
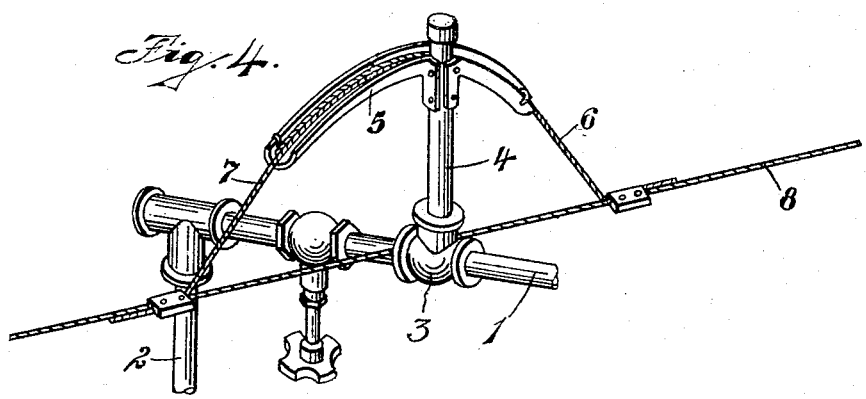
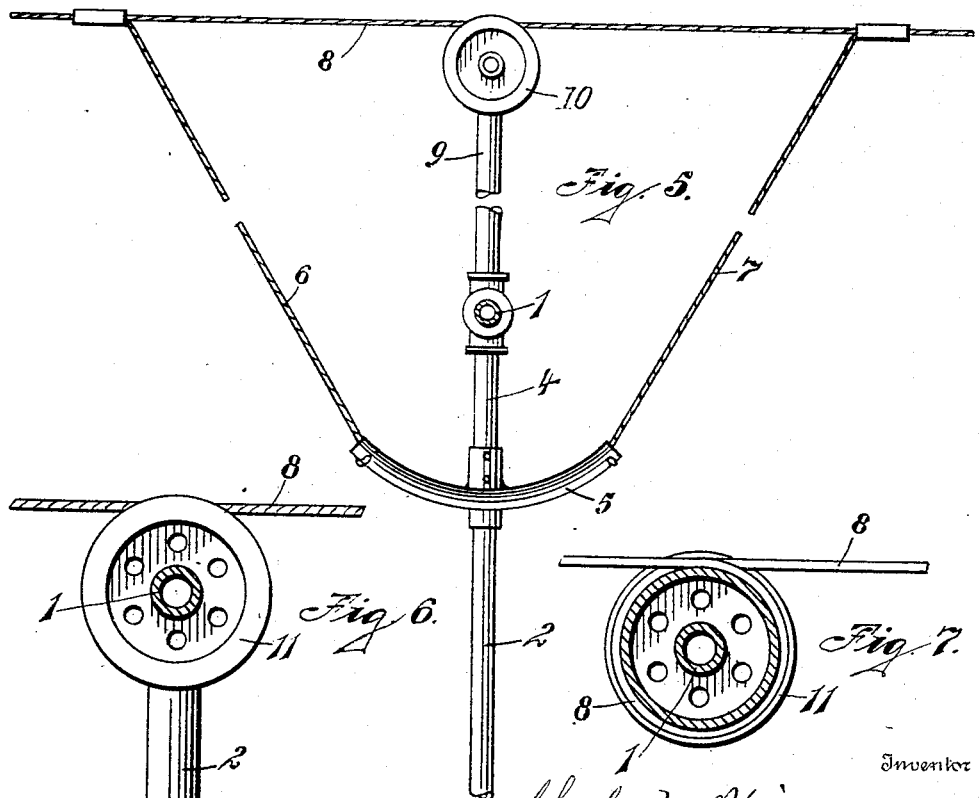

UNITED STATES PATENT OFFICE.

CHARLES W. SKINNER, OF TROY, OHIO, ASSIGNOR TO THE SKINNER IRRIGATION COMPANY, OF TROY, OHIO, A CORPORATION OF OHIO.

IRRIGATION APPARATUS.

1,197,772.  Specification of Letters Patent.  Patented Sept. 12, 1916.

Application filed September 11, 1909. Serial No. 517,316.

*To all whom it may concern:*

Be it known that I, CHARLES W. SKINNER, a citizen of the United States, residing at Troy, in the county of Miami and State of Ohio, have invented certain new and useful Improvements in Irrigation Apparatus, of which the following is a specification.

This invention relates to improvements in irrigating apparatus, and particularly to that system of irrigation set forth in my Letters Patent No. 614,507, dated November 22, 1898.

The object of the invention is to provide means for operating the various rotatable nozzle lines simultaneously and uniformly for the purpose of turning the streams of water to different points upon the ground on which the apparatus is installed.

The invention consists in the construction and combinations of parts hereinafter described and set forth in the claims.

In the accompanying drawings, Figure 1 is a perspective view of an irrigating apparatus to which my improvements have been applied. Fig. 2 is a top plan view of a portion of the operating devices. Fig. 3 is a perspective view of the turning device. Figs. 4 to 7 inclusive, are modifications hereinafter referred to.

Like parts are indicated by similar characters of reference in the several views.

In my system of irrigation I employ a series of parallel nozzle lines, which are connected to a source of water supply and are so arranged as to be turned or rotated to direct the streams of water to any point desired, a brief description of which with special reference to the drawings of this application is as follows:

$a$, $a^1$, $a^2$, $a^3$, $a^4$, $a^5$, $a^6$, and $a^7$ represent the nozzle lines, four of which are shown in the present instance, each consisting of two independent nozzle pipes, but any number of which may be employed as will be understood. These nozzle lines are rotatably supported on upright supporting posts $a^8$ located at suitable distances apart and having their upper ends forked or otherwise suitably formed to receive the nozzle pipes.

$a^9$ represents the water supply pipes which communicate with any suitable source of water supply and are connected to the nozzle lines by rotatable connecting devices $a^{10}$; this device being shown and described in my Letters Patent No. 852,584, issued May 7th, 1907, need not be described in detail here, it being sufficient to state that the rotatable connecting device is rigidly connected with the nozzle pipe, but is so connected with the supply pipe $a^9$ as to be capable of rotation in respect thereto. In the present instance I have shown one of these supply pipes $a^9$ connected to the two nozzle pipes of each line in which case two of the rotatable connecting devices $a^{10}$ will be employed, one for each pipe. As explained in my prior patent referred to, this rotatable connecting device has a projecting handle, represented by $a^{11}$ in the drawings of the present case, and it is to these projecting handles $a^{11}$ that my improved devices for operating the nozzle pipes are attached. The respective pipes are supplied with nozzles $a^{13}$, which may be of the form shown in the prior Patent No. 614,507 previously referred to or the nozzle described in my Patent No. 868,715, issued October 22nd, 1907.

Connected to the end of each of the projecting pieces $a^{11}$ is a segment $b$ formed on the arc of a circle whose center is preferably the center of the rotatable connecting piece $a^{10}$. As shown in Fig. 2 the outer circumference of each of these segments $b$ is grooved or channel shaped. Located at a common point is what I term the turning device, which consists of a pulley $c$ mounted in the supporting casting $c^1$ secured to an upright supporting post $c^2$; said pulley having connected to one end of its shaft a crank $c^3$. The rope or cable $c^4$ passes about this pulley thence over pulleys $c^5$ secured to the upper end of the supporting post $c^2$, thence laterally across and at right angles with respect to the pipe lines between the respective pairs of projecting pieces $a^{11}$ and over a pair of pulleys $c^6$ on each of the supporting posts $c^7$; this rope or cable $c^4$ being continuous and connected to the segments $b$ in the manner hereinafter described so that when the crank is turned by the operator all of the pipe lines will be turned or rotated. This cable $c^4$ may be either of rope or wire but that part of it which passes over the pulley $c$ is preferably formed of a chain as shown and if desired the pulley may have a series of teeth which will engage the respective links of the chain.

Connected to the lower strand of the cable $c^4$ are cross-bars $c^8$, a pair of these cross-bars being provided for each pair of operating segments $b$. Connected to the respective ends of each of the segments $b$, and extending about the grooved periphery of the same and secured to the respective cross bars $c^8$, are auxiliary cables $c^9$ and $c^{10}$; said cables being also extended beyond the cross-bars and connected to the main cable $c^4$ at $c^{11}$ as shown. The result of this construction is that is that each time the operator turns the crank $c^3$ the cable $c^4$ through its connections with the rotatable connecting devices $a^{10}$ will cause the respective nozzle pipes to turn or rotate. By the peculiar form of connection described between this cable $c^4$ and the rotating connecting parts $a^{10}$, a leverage is provided which will permit the pipes to be readily and easily turned in their supports.

By this apparatus it will be seen that a single operator can, with the expenditure of a very small amount of time and labor, operate the entire apparatus at given intervals so as to simultaneously and uniformly change the direction of the streams of water.

In Fig. 4 is shown the manner of operating a single nozzle line in cases where the main operating cable is connected to the nozzle lines at the end of the field. In this figure, 1 represents the nozzle line and 2 the supply pipe. 3 is the rotatable connection, having the usual projecting part 4 to the upper end of which is secured the grooved segment 5, to which the auxiliary cables 6 and 7 are attached in the manner previously described in connection with the segments, $b$. In this case, of course, the cross-bars, $c^8$, will be dispensed with and the auxiliary cables connected directly to the main cable, 8, as shown.

In some instances it is necessary to locate the main cable high up in order that it may clear vehicles driven through the field where the apparatus is installed. The manner of connecting the operating devices to the cable when so installed is shown in Fig. 5. In this case the parts 4 and 5 are projected downwardly from the nozzle line and the auxiliary cables 6 and 7 extended up and connected with the main cable. When thus installed, the supply pipes 2 or the other supports will be extended upwardly for a suitable distance, as indicated at 9, and may have at their upper ends sheaves 10 to support the main cable.

In Figs. 6 and 7 is shown a modification in which the handles 4 and segments 5 are dispensed with and a pulley 11, about which is wound the main cable, connected with the nozzle line.

Other modifications of like nature may be made and I do not, therefore, limit myself to the exact constructions shown and described.

Having thus described my invention, I claim:

1. In an irrigating system, a series of sprinkler pipes, a series of supply pipes connected therewith, a series of circular pieces having a connection with said sprinkler pipes, and a main cable extending across the series of sprinkler pipes, said main cable having an operative connection with each of said circular pieces, substantially as specified.

2. In an irrigating system, a series of sprinkler pipes, a series of supply pipes connected thereto, a series of circular pieces having a connection with said sprinkler pipes, each of said circular pieces having a grooved outer periphery, and a main cable extending across the series of sprinkler pipes and having an operative connection with said grooved circular pieces, substantially as specified.

3. In an irrigating system, a series of sprinkler pipes, a series of supply pipes connected therewith, a series of circular pieces connected with said sprinkler pipes, a main cable extending across the series of sprinkler pipes, and auxiliary cables connected with said circular pieces and said main cable, the connection of each of said auxiliary cables with said circular pieces being on the opposite side of the sprinkler pipe from the connection between said auxiliary cable and said main cable, substantially as specified.

4. In an irrigating system, a series of sprinkler pipes, a series of supply pipes connected therewith in a manner to permit rotatable movement of said sprinkler pipes independent of said supply pipes, a series of circular pieces connected with said sprinkler pipes each having a grooved outer periphery, a main cable extending across the series of sprinkler pipes, and auxiliary cables connecting said circular pieces with said main cable, the point of connection of each of said auxiliary cables with its circular piece being on the opposite side of the sprinkler pipe from the connection with said main cable so that said auxiliary cables extend about the grooved periphery of said circular piece, substantially as specified.

5. In an irrigating system, a series of sprinkler lines, each line having independent sprinkler pipes, a series of supply pipes, rotatable connecting parts connecting each of said supply pipes to two adjacent sprinkler pipes of each line, an extended circular piece, one for each sprinkler pipe, having a connection therewith, a main operating cable extending across the series of sprinkler lines, a cross-bar connected to said cable on each side of each line, and auxiliary cables connecting said circular pieces with said cross-bars, each of said auxiliary cables being connected with its circular piece on the opposite side of the line from its connection with the cross-bar so that it extends about the periphery of said circular piece, substantially as specified.

6. An irrigating system comprising: a series of sprinkler pipes in spaced relation to control adjacent areas to be irrigated, a single series of nozzles in each pipe, the nozzles of each series extending in substantially the same radial plane, a water supply connected with the sprinkler pipes, and means for oscillating the pipes from a common point and maintaining the several series of nozzles in substantially the same circumferential position to simultaneously irrigate adjacent areas and to sprinkle each area progressively.

7. In an irrigation system, a series of parallel nozzle lines arranged parallel to the ground, each line consisting of a plurality of alined pipes, a water supply connected with said pipes, a cable extending across the series of lines, means for connecting said cable with said pipes at points in proximity to the adjacent ends of pipes in the same line, and devices for operating said cable to simultaneously operate all said pipes in the same direction, substantially as specified.

8. In an irrigation system, a series of parallel nozzle lines arranged parallel to the ground, each line being composed of a plurality of alined pipes supported to rotate independently of each other, segment-shaped pieces connected with the respective pipes of each line at points near the adjacent ends of said pipes, a cable extending across the series of lines between said segment-shaped pieces, means for connecting said cable to said segment-shaped pieces, and devices for operating said cable to simultaneously oscillate all of said lines, substantially as specified.

9. In a system of irrigation, a series of parallel nozzle lines arranged parallel to the ground, each line consisting of a plurality of alined pipes, upright water supply pipes, means for rotatably connecting the adjacent ends of the pipes of the same line with said upright supply pipes respectively, a cable extending across the series of lines, segment-shaped projecting parts on the respective pipes of each nozzle line, means for connecting said cable with said segment-shaped parts, and devices for operating said cable to simultaneously oscillate all of said lines, substantially as specified.

In testimony whereof, I have hereunto set my hand this 6th day of September, 1909.

CHARLES W. SKINNER.

Witnesses:
    LEONARD H. SHIPMAN,
    FLORENCE L. DE FREES.

Copies of this patent may be obtained for five cents each, by addressing the "Commissioner of Patents, Washington, D. C."